(12) United States Patent
Wegmann (10) Patent No.: US 8,756,570 B2
(45) Date of Patent: Jun. 17, 2014

(54) DEFINING A CONDITIONAL BREAKPOINT

(75) Inventor: Martin Wegmann, Worms (DE)

(73) Assignee: SAP AG, Walldorf (DE)

( * ) Notice: Subject to any disclaimer, the term of this patent is extended or adjusted under 35 U.S.C. 154(b) by 1227 days.

(21) Appl. No.: 12/346,595

(22) Filed: Dec. 30, 2008

(65) Prior Publication Data

US 2010/0169867 A1  Jul. 1, 2010

(51) Int. Cl.
*G06F 9/44* (2006.01)
(52) U.S. Cl.
USPC .......................................... 717/124; 717/129
(58) Field of Classification Search
USPC .................................................. 717/124, 129
See application file for complete search history.

(56) References Cited

U.S. PATENT DOCUMENTS

| | | | |
|---|---|---|---|
| 6,219,803 B1 * | 4/2001 | Casella et al. ............. | 714/38.13 |
| 6,412,106 B1 * | 6/2002 | Leask et al. .................... | 717/124 |
| 6,587,995 B1 * | 7/2003 | Duboc et al. .................. | 716/106 |
| 7,150,002 B1 | 12/2006 | Anderson et al. | |
| 7,464,373 B1 * | 12/2008 | Yunt et al. ...................... | 717/125 |
| 2004/0031019 A1 | 2/2004 | Lamanna et al. | |
| 2006/0041867 A1 * | 2/2006 | Bates et al. .................... | 717/129 |
| 2008/0134149 A1 * | 6/2008 | Bates et al. .................... | 717/129 |

OTHER PUBLICATIONS

Jablonowski, "VASE: The visualization and application steering environment", Nov. 15, 1993, SuperComputing, pp. 560-569.*
P. Aitken, "Debugging Scripts" in: *Powering Office 2003 with XML* (Indianapolis, IN, Wiley Publishing, 2004), pp. 119-120.

'Breakpoints' [online]. SAP, [retrieved on May 20, 2009]. Retrieved from the Internet: <URL: http://help.sap.com/saphelp_nw70/helpdata/EN/c6/617cbee68c11d2b2ab080009b43351/content.htm>, 2 pages.
'ABAP Keyword Documentation' [online]. SAP, 2009, [retrieved on May 20, 2009]. Retrieved from the Internet: <URL:http://help.sap.com/abapdocu/en/ABAPASSERT.htm>, 4 pages.
'JavaScript break and continue Statements for Loops' [online]. Web Developers Notes, 2000-2007, [retrieved on May 20, 2009]. Retrieved from the Internet: <URL: http://web.archive.org/web/20071122000620/http://www.webdevelopersnotes.com/tutorials/javascript/javascript_break_continu..>, 4 pages.
'Debugger' [online]. Wikipedia, 2007, [retrieved on May 20, 2009]. Retrieved from the Internet: <URL: http://web.archive.org/web/20071016170520/http://en.wikipedia.org/wiki/Debugger>, 4 pages.

(Continued)

*Primary Examiner* — Li B Zhen
*Assistant Examiner* — Duy Khuong Nguyen
(74) *Attorney, Agent, or Firm* — Fish & Richardson P.C.

(57) ABSTRACT

Among other disclosed subject matter, a computer program product is tangibly embodied in a computer-readable storage medium and includes instructions that when executed by a processor perform a method for defining a conditional breakpoint in an application program. The method includes receiving a selection of an event in an application program by a user, the event selected for activating a conditional breakpoint that interrupts execution of the application program. The method includes receiving at least one condition of multiple predefined conditions that are associated with the event and made available to the user for selection, the condition selected by the user to condition activation of the conditional breakpoint. The method includes implementing the conditional breakpoint in relation to the application program, the conditional breakpoint configured to interrupt execution of the application program upon the event occurring provided that the condition is satisfied.

14 Claims, 6 Drawing Sheets

(56) References Cited

OTHER PUBLICATIONS

'ABAP' [online]. Wikipedia, 2007, [retrieved on May 20, 2009]. Retrieved from the Internet: <URL: http://web.archive.org/web/20071122171320/http://en/wikipedia.org/wiki/Abap>, 22 pages.

Jablonowski, D. J et al, "VASE: The visualization and application steering environment", Supercomputing '93, Proceedings Nov. 15-19, 1993, pp. 560-569.

European Search Report, European Application No. EP 09 01 5963 dated Feb. 25, 2010.

* cited by examiner

FIG. 1

```
...
method WRITE_ERROR_PAGE

* reset
    ME->EXCEPTION_WRITTEN = ABAP_FALSE.

* Conditional Breakpoint
    assert id crmuif_conditional_breakpoints
        subkey 'UI_Framework – CX_BSP_WD_* Exception'
202
        condition cl_bsp_wd_cond_breakpoints=>assert (
            iv_break_event = 'CX_BSP_WD_EXCEPTION',
204
            iv_object_to_check = iv_exception
        ) = abap_true.     "#EC NOTEXT
...
```

DEFINING A CONDITIONAL BREAKPOINT

TECHNICAL FIELD

This document relates to the use of a breakpoint for halting execution of an application program.

BACKGROUND

In software development, a developer can use breakpoints to pause or halt the execution of an application program to assist them in the debugging of the application program code. A developer can place software breakpoints at strategic locations throughout the application program code. The developer can select locations where halting program execution may be beneficial for debugging purposes. These locations may also be selected as locations within the application code where halting the code will not adversely affect the system performance. Once the breakpoint is triggered and the program halts, the developer can access the current state of the program environment to determine if the program is functioning as expected.

SUMMARY

The invention relates to defining a conditional breakpoint.

In a first aspect, a computer program product is tangibly embodied in a computer-readable storage medium and includes instructions that when executed by a processor perform a method for defining a conditional breakpoint in an application program. The method includes receiving a selection of an event in an application program by a user, the event selected for activating a conditional breakpoint that interrupts execution of the application program. The method includes receiving at least one condition of multiple predefined conditions that are associated with the event and made available to the user for selection, the condition selected by the user to condition activation of the conditional breakpoint. The method includes implementing the conditional breakpoint in relation to the application program, the conditional breakpoint configured to interrupt execution of the application program upon the event occurring provided that the condition is satisfied.

Implementations can include any or all of the following features. The method can further include receiving a selection of a portion of the application program, wherein the conditional breakpoint will interrupt the execution if the event occurs in the portion provided that the condition is met. The user can generate inputs under guidance of a graphical user interface, and the method can further include populating a control with user-selectable events for the user to choose between, the control populated based on the portion identified by the user. The graphical user interface can be configured so that upon the user not specifying any portion of the application program, the control can be populated with at least one user-selectable event applicable to multiple portions of the application program. The graphical user interface can include a disablement control associated with the conditional breakpoint, wherein upon the user selecting the disablement control the conditional breakpoint is disabled and the event and condition remain associated with the conditional breakpoint. The conditional breakpoint is located in a startup section of the application program, executed before the application program generates a user interface. The conditional breakpoint can be placed in the application program by a developer at a manufacturer entity, and the conditional breakpoint can be configured to remain in the application program as the application program is delivered to a customer entity and wherein user input identifying the event and the condition is received from the user at the customer entity. The method can further include receiving a definition of another breakpoint configured to interrupt the execution upon any event where a client communicates with a server. The method can further include receiving a definition of another breakpoint configured to interrupt the execution upon any error or exception in the execution of the application program.

In a second aspect, a computer program product is tangibly embodied in a computer-readable storage medium and includes instructions that when executed by a processor perform a method for activating a conditional breakpoint in an application program. The method includes detecting a conditional breakpoint in an application program being executed, the conditional breakpoint detected at a location in the application program that was defined based on a user selecting an event for activation of the conditional breakpoint. The method includes identifying a condition to which the conditional breakpoint is subject, the condition having been selected by the user from among multiple predefined conditions associated with the event to condition the activation. The method includes interrupting execution of the application program provided that the condition is satisfied.

Implementations can include any or all of the following features. The method can further include launching a debugger application for the application program in response to the execution being interrupted. The conditional breakpoint can be located in a startup section of the application program, and the conditional breakpoint can be detected in the execution of the startup section before the application program generates a user interface.

In a third aspect, a computer program product is tangibly embodied in a computer-readable storage medium, the computer program product including instructions that, when executed, generate on a display device a graphical user interface for defining a conditional breakpoint in an application program. The graphical user interface includes an event selection area for a user to select an event in an application program for activating a conditional breakpoint that interrupts execution of the application program. The graphical user interface includes a condition selection area for the user to select at least one condition of multiple predefined conditions that are associated with the event, the condition selected to condition activation of the conditional breakpoint. The conditional breakpoint is implemented in relation to the application program so that execution of the application program is interrupted provided that the condition is satisfied.

Implementations can include any or all of the following features. The graphical user interface can further include a disablement control associated with the conditional breakpoint, wherein upon the user selecting the disablement control the conditional breakpoint is disabled and the event and condition remain associated with the conditional breakpoint. The graphical user interface can further include a breakpoint-defining control for defining another breakpoint configured to interrupt the execution upon any event where a client communicates with a server. The graphical user interface can further include a breakpoint-defining control for defining another breakpoint configured to interrupt the execution upon any error or exception in the execution of the application program. The graphical user interface can further include a portion selection area for the user to identify a portion of the application program, wherein the conditional breakpoint will break the application program during the execution if the event occurs in the portion provided that the condition is met. The graphical user interface can further include a startup breaking control for the user to define the conditional breakpoint to be located in a startup section of the application program, wherein the conditional breakpoint is detected in the execution of the startup section before the application program generates a user interface. The graphical user interface can further include at least one attribute selector for the user to choose at least one attribute of multiple attributes defined in the application program; and at least one value control associated with the attribute selector for the user to enter a value for the attribute; wherein the condition is satisfied upon the attribute having the value when the conditional breakpoint is detected. The condition selection area can include multiple pairs of attribute selectors and value controls combined by a logical AND operator.

Implementations can provide any or all of the following advantages. Sophisticated framework- and application-errors can be detected early. An application can be delivered with built-in powerful consistency checks. A conditional breakpoint can be particularly suited for frameworks where standard debugging is insufficient. Conditional debugging can be used inhouse at the manufacturer and in the customer system. Conditional breakpoints are suited also for non-expert users. Conditional breakpoints can be provided step-by-step. An implementation effort is limited.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Analysis and debugging of complex framework based application coding using breakpoints can be difficult. The use of frameworks can allow the application code to specialize and reuse common code that provides generic functionality. However, because of the deep call hierarchy inherent in a complex framework based application many accesses through a debugger may be needed to eventually reach the code objects that cause a particular defect. Additionally, since the same coding can be called frequently in a framework it may be hard to interrupt the framework execution at the appropriate time to analyze and debug the specific condition causing the program execution error.

The use of conditional breakpoints can allow a developer the ability to set up a breakpoint in a complex framework based application program whenever the code satisfies a particular condition or situation. This can reduce the number of debugger accesses needed to reach the code object that caused the defect as well as to allow the framework based application program execution to occur at the appropriate time and under the appropriate conditions for which the error occurs.

Figure 1:
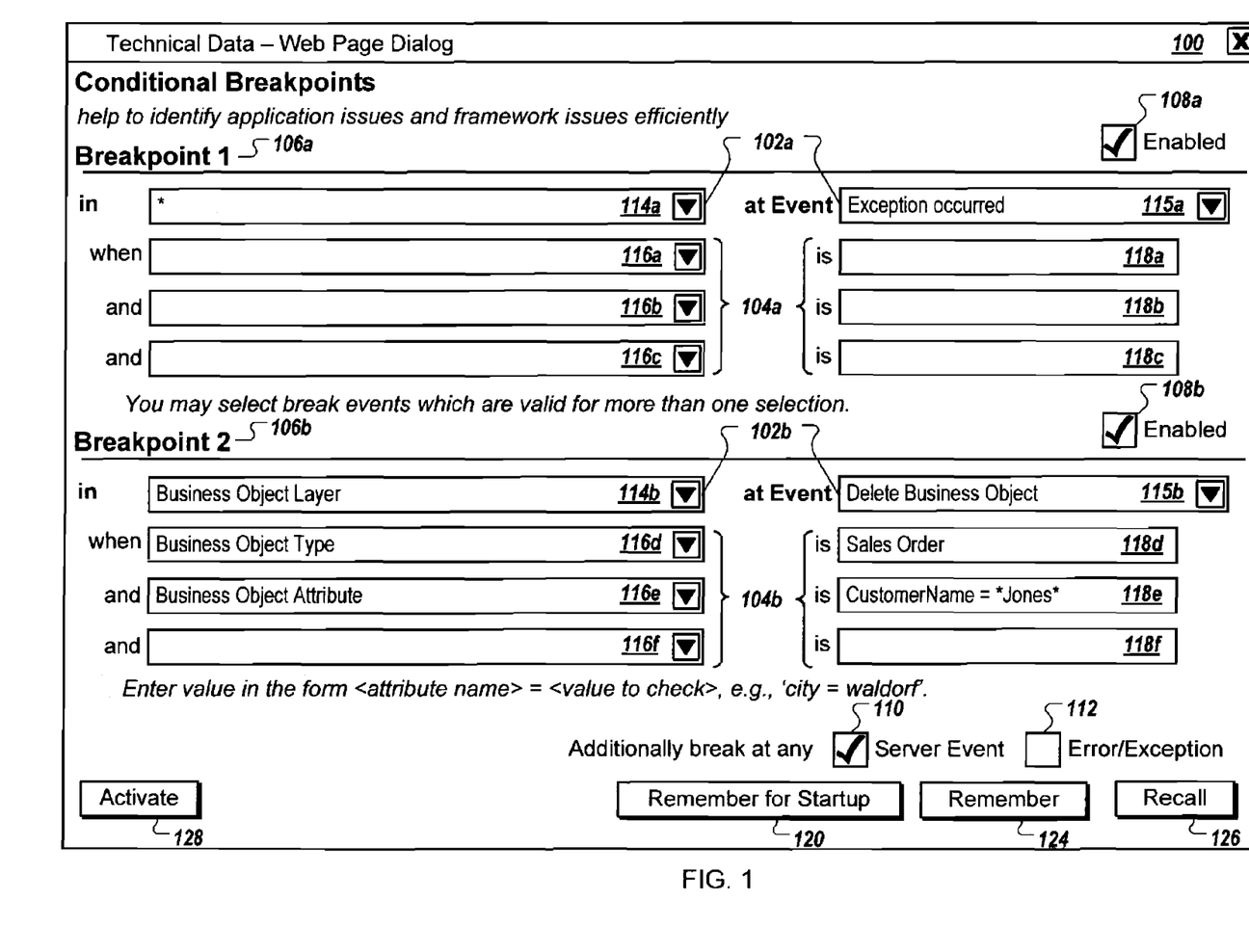
FIG. 1 is a screen shot of an exemplary user interface that can be used to specify one or more conditions that define and activate a conditional breakpoint.

FIG. 1 is a screen shot of an exemplary user interface 100 that can be used to specify one or more conditions that define and activate a conditional breakpoint. A developer during framework based application code development can place conditional breakpoints throughout the code. This example will be described further with reference to FIG. 2. Prior to executing the framework based application program code, a user can choose to activate the conditional breakpoints in the application code. The user can then start the application program execution with external debugging activated. The user can then enter a specific hot-key combination (e.g., Alt-F2) to bring up the user interface 100, which displays a conditional breakpoints window in the framework based application program.

The user interface 100 can include selection areas to enter conditions for two conditional breakpoints, breakpoint 106a and breakpoint 106b. Breakpoints 106a, 106b can include event selection areas 102a, 102b respectively. The event selection areas 102a, 102b can include portion selection areas 114a, 114b respectively. The portion selection areas 114a, 114b can allow the user the ability to select the specific portion of the framework based application program that the conditional breakpoint resides in from a pre-defined group. For example, the conditional breakpoint may reside in a particular software package used within the code framework. The portion areas 102a, 102b can also include event selection areas 115a, 115b respectively. The event selection area 115a can allow the user the ability to select, from a pre-defined group, the specific event within the selected portion of the framework based application program, indicated by the portion selection area 114a, that can trigger the conditional breakpoint 106a. Event selection area 115b can operate in a similar manner.

Breakpoints 106a, 106b can also include condition selection areas 104a, 104b respectively. The condition selection areas 104a, 104b can allow the user the ability to select the conditions under which a breakpoint will trigger for the selected event within the selected portion of the framework based application program. The condition selection areas 104a, 104b can each include three attribute selectors 116a-116c, 116d-116f respectively. Each attribute selector 116a-f has associated with it a value control 118a-118f respectively. Each attribute selector/value control pair can allow a user to select a specific attribute and an attribute value that can determine a condition under which a breakpoint will trigger for the selected event within the selected portion of the framework based application program. The attribute selector/value control pairs can be combined by a logical AND operator. In some implementations, the condition selection areas 104a, 104b can include more than or less than three attribute selector/value control pairs. In some implementations, the user interface 100 can include more than two conditional breakpoints.

The user, by checking enabled boxes 108a, 108b, can selectively enable breakpoints 106a, 106b respectively. The user can uncheck the enabled boxes 108a, 108b to disable breakpoints 106a, 106b, respectively, without the need to clear any of the condition entries for the breakpoints.

The user interface 100 can include the ability for a user to select an additional two conditional breakpoints. A server event box 110 can allow a user to enable a server event conditional breakpoint by checking the server event box 110. Communication between a client and a server can cause the server event conditional breakpoint to trigger. For example, the user entering information into a user interface (e.g., a name entry into a dialog box) and then indicating acceptance of this information (e.g., user activates an OK button) can trigger a server event conditional breakpoint. An error/exception box 112 can allow a user to enable an error/exception conditional breakpoint by checking the error/exception box 112. A trapped error condition or an exception condition within the framework based application program can cause an error/exception conditional breakpoint to trigger. A developer during code development can place specific commands throughout the code that will pause or stop program execution when a defined exception or error condition occurs.

Control buttons can be included in the user interface 100 to control the use of the conditional breakpoints. An activate control button 128 can control the activation of the conditional breakpoints entered by the user in the user interface 100. When the user activates the activate control button 128, the framework based application program can accept the user entries for the conditional breakpoints 106a, 106b as well as the entries made in the enable boxes 108a, 108b, the server event box 110 and the error/exception box 112, and close the user interface 100. The application program can then continue execution. The application program can pause or stop if any of the application program code encounters any of the conditional breakpoints specified by the user. Upon encountering a conditional breakpoint, the application program can enter a debugger application and the debugger application can display a debugger interface to the user. The debugger interface will be described in more detail with reference to FIG. 3.

A remember control button 124 can save the entries made by the user in the event selection areas 102a, 102b and the condition selection areas 104a, 104b for the conditional breakpoints 106a, 106b respectively. It can also save the selections made by the user in the enabled boxes 108a, 108b, the server event box 110 and the error/exception box 112. Subsequently, when the user enters a specific hot-key combination to bring up the user interface 100, the user can activate a recall control button 126 that can restore the previously saved conditional breakpoints and repopulate the user interface 100 with those selections.

A remember for startup control button 120 can save the entries made by the user in the event selection areas 102a, 102b and the condition selection areas 104a, 104b for the conditional breakpoints 106a, 106b respectively. It can also store the selections made by the user in the enabled boxes 108a, 108b, the server event box 110 and the error/exception box 112. The saved conditional breakpoint entries can define conditional breakpoints that can be located in a startup section of the framework based application program before the application program can generate a user interface. This can allow the use of conditional breakpoints in application program code before a user interface can allow the ability for the user to enter the conditional breakpoint selections and conditions.

In the example of FIG. 1, the user selected all the breakpoint providers included in the framework based application program by selecting the "*" in the portion selection area 114a for conditional breakpoint 106a. The user selected "Exception occurred" in the event selection area 115a associated with the portion selection area 114a. The "Exception occurred" is the specific event within all the breakpoint providers in the application code that can trigger a conditional breakpoint. The user, by checking enabled box 108a has enabled conditional breakpoint 106a. Therefore, in this example, the conditional breakpoint 106a triggers when an exception occurs in the application program.

Also in the example of FIG. 1, the user selected "Business Object Layer" in the portion selection area 114b for conditional breakpoint 106b. The user selected "Delete Business Object" in the event selection area 115b associated with the portion selection area 114b. The "Delete Business Object" is the specific event within the "Business Object Layer" provider in the application code that can trigger a conditional breakpoint. Additionally, the user selected "Business Object Type" in the attribute selector 116d and entered "Sales Order" in the associated value control 118d. The "Sales Order" is the specific value within the "Business Object Type" attribute that can trigger a conditional breakpoint. The user selected "Business Object Attribute" in the attribute selector 116e and entered "CustomerName=*Jones*" in the associated value control 118e. The "CustomerName=*Jones*" is the specific value within the "Business Object Attribute" attribute that can trigger a conditional breakpoint. In the example, the attribute selectors 116d, 166e and their associated values controls 118d, 188e are combined using a logical AND operation. Therefore, both conditions should occur in order for a conditional breakpoint to occur. The user, by checking enabled box 108b has enabled conditional breakpoint 106b. Therefore, in this example, the application program triggers the conditional breakpoint 106b when a business object type "Sales Order" is deleted that has the value "Jones" in its attribute "Customer Name".

For conditional breakpoint 106b, the number of breakpoints is reduced by having the conditional breakpoint 106b occur on a deletion of a sales order business object type and not the deletion of all business object types. Further breakpoint reductions occur by specifying that the sales order business object type have the value "Jones" in its attribute "Customer Name". Therefore, the breakpoint occurs when a specific event occurs in a specific business object type and the specific business object type has a specific attribute with a specific value.

In some implementations, a user can investigate an application program error or exception, for example, reported by a customer. The user can choose to activate the conditional breakpoints in the application code. The user can then start the application program execution with external debugging activated. The user can then enter a specific hot-key combination (e.g., Alt-F2) to bring up the user interface 100. The user can set a conditional breakpoint to interrupt the application program whenever the application program detects an error or exception. For example, the user can do this by checking the error/exception box 112 in the user interface 100. During replay of the error situation by the application program, the conditional breakpoint triggers and the application program can enter a debugger application and the debugger application can display a debugger interface to the user. The user can use the debugger to identify the erroneous code.

In some implementations, a user can investigate why a particular erroneous event occurred in the application program. For example, the user can determine why a sales order for a particular customer (e.g., Jones) no longer exists. The user can choose to activate the conditional breakpoints in the application code. The user can then start the application program execution with external debugging activated. The user can then enter a specific hot-key combination (e.g., Alt-F2) to bring up the user interface 100. The user can enter a conditional breakpoint to occur when the sales order is deleted (e.g., breakpoint 106b). During replay of the situation specified by the conditional breakpoint, the breakpoint triggers and the application program can enter a debugger application and the debugger application can display a debugger interface to the user. The debugger interface can display a call stack that can show which piece of the application program code triggered the deletion of the specific sales order.

In some implementations, a user can investigate what occurs in the application program code when the user enters information into a user interface. For example, the user enters a value for a specific parameter in a dialog box and then activates an "OK" button to have the application program accept the entry. The user can choose to activate the conditional breakpoints in the application code. The user can then start the application program execution with external debugging activated. The user can then enter a specific hot-key combination (e.g., Alt-F2) to bring up the user interface 100. The user can set a conditional breakpoint to interrupt the application program whenever the application program detects a server event. For example, the user can do this by checking the server event box 110 in the user interface 100. On the next server event, the conditional breakpoint triggers and the application program can enter a debugger application and the debugger application can display a debugger interface to the user. The user can access the event handler to investigate what transpired between the client running the user interface and the server receiving the information from the client.

Figure 2:
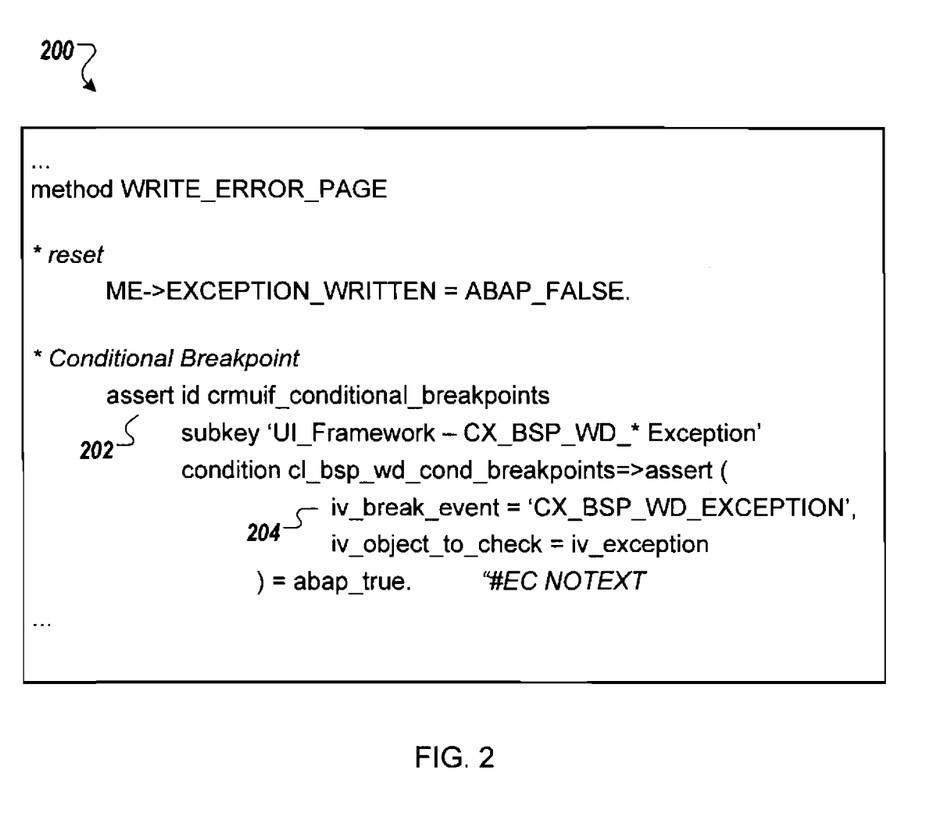
FIG. 2 is a block diagram of exemplary computer code that can implement a conditional breakpoint.

FIG. 2 is a block diagram of exemplary computer code 200 that implements a conditional breakpoint. The exemplary computer code 200 shows a conditional breakpoint based on an ASSERT statement (line 202). In the example of FIG. 2, the exemplary computer code 200 shows an exception condition (line 204) as the event that can trigger the conditional breakpoint. The exemplary computer code 200 can be located at any location within the application program code.

The conditions input by a user in the user interface 100 for breakpoint 106a can enable the conditional breakpoint, implemented by the exemplary computer code 200, within the application program code. In some implementations, a plurality of conditional breakpoints triggered by an exception event can be implemented using the exemplary computer code 200 and can be located throughout the application program code. Therefore, each time the exception condition occurs, the conditional breakpoint can trigger, the application halts and the user can then access a debugger.

A developer can place a plurality of conditional breakpoints at various locations throughout the application program code. For example, the developer may place conditional breakpoints at error prone locations in the application program code. An example of such an error prone location can be a location in program code that is mathematically computationally intensive and prone to calculation errors. In another example, the developer may place the conditional breakpoints at central locations in the application program code that multiple program components access frequently. Examples of these code locations can be memory accesses and user interface interactions and updates.

The exemplary computer code 200 shows the use of an ASSERT statement (line 202) to implement a conditional breakpoint triggered by an exception error (line 204). In some implementations, a developer can use an ASSERT statement and additional code statements to implement a conditional breakpoint defined by a break event and one or more break conditions. A plurality of these types of breakpoints can be located at various locations throughout the application program code. For example, using user interface 100 as shown in FIG. 1, a user can select a specific portion of the application program that a conditional breakpoint can reside in from a pre-defined group using portion selection area 104b and the event that will trigger the breakpoint from event selection area 115b. Additionally, the user can select one or more specific conditions in the selected portion of the application program code under which the selected event will trigger. The conditions can be combined by a logical AND operation. Breakpoint 106b in FIG. 1 is an example of a user interface and the selected entries. The event that can trigger the conditional breakpoint and the conditions under which the event can trigger the conditional breakpoint can be included in computer code, similar to the exemplary computer code 200, that uses an ASSERT statement and additional code statements to implement the conditional breakpoint.

In some implementations, a developer can use an ASSERT statement and additional code statements to implement a conditional breakpoint triggered by any communication between a client and a server. A plurality of these types of breakpoints can be located at various locations throughout the application program code. For example, using user interface 100 as shown in FIG. 1, a user can enable the server event conditional breakpoints by checking the server event box 110.

In some implementations, a developer can use an ASSERT statement and additional code statements to implement a conditional breakpoint triggered by an exception error. A plurality of these types of breakpoints can be located at various locations throughout the application program code. For example, using user interface 100 as shown in FIG. 1, a user can enable the error/exception conditional breakpoints by checking the error/exception event box 112.

Figure 3:
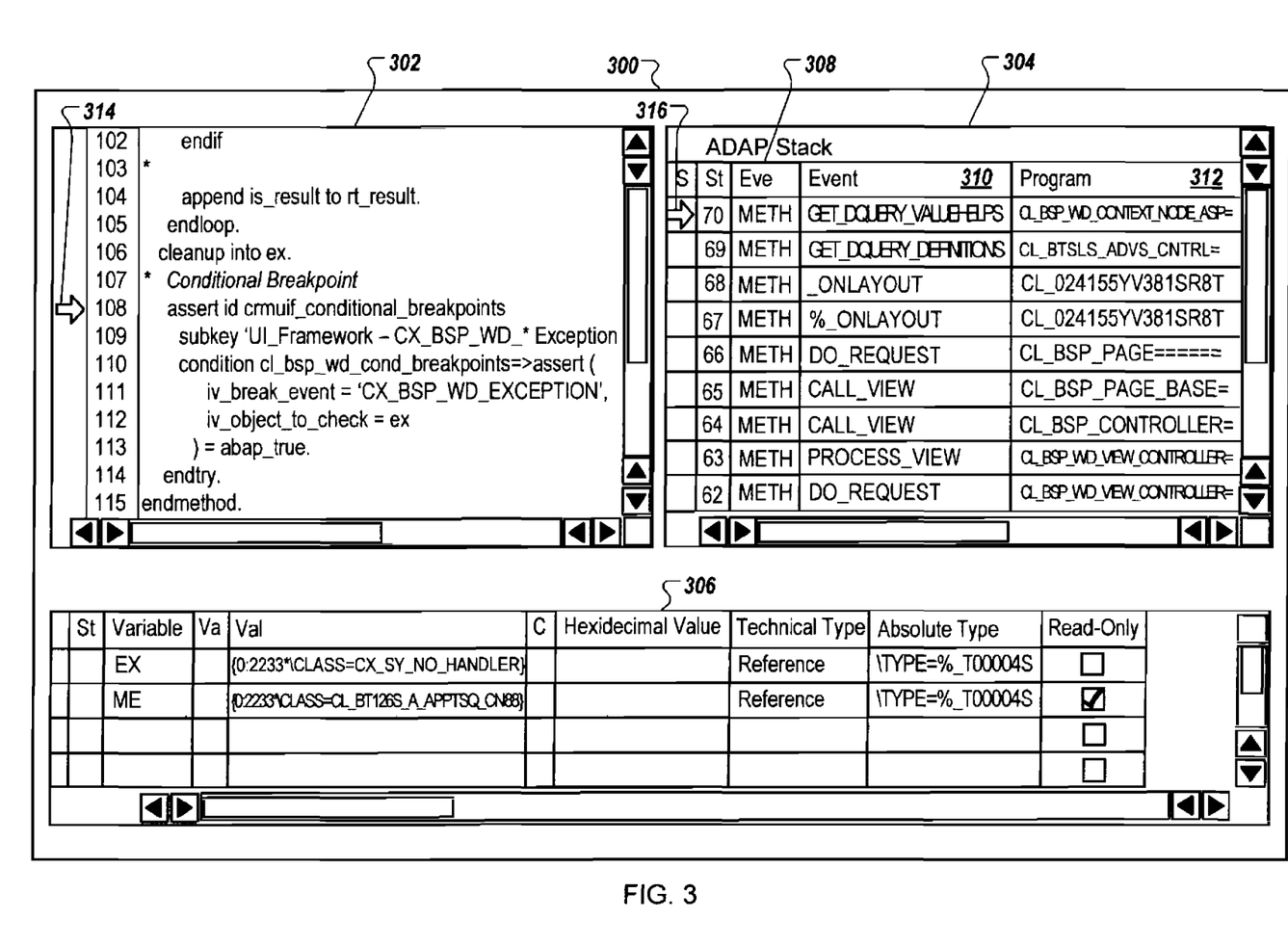
FIG. 3 is a screen shot of an exemplary user interface for a debugger that can be invoked when a conditional breakpoint has been reached and its conditions have been satisfied.

FIG. 3 is a screen shot of an exemplary user interface 300 for a debugger application that can be invoked when a conditional breakpoint is reached and its conditions are satisfied. In some implementations, the debugger application pops up automatically when the application program code reaches a conditional breakpoint where the event and conditions for the conditional breakpoint are satisfied. In some implementations, a user may manually invoke the debugger application (e.g., by entering a hot key combination). Prior to the display of the user interface 300, the application program can be interrupted and halted. In some implementations, the application program code can be interrupted and program execution may stop or end.

The exemplary user interface for the debugger application 300 can include window 302, window 304 and window 306. Window 302 can show a code stack that includes the location in the framework application program code where the conditional breakpoint occurred and the conditional breakpoint code executed to cause the interruption of the application. For example, the code can be the computer code 200 shown in FIG. 2. Window 304 can show a program stack that can include information about a method 308 and events 310 associated with and included in method 308. The program stack can also include information about an application controller 312, which is the location of the code stack, shown in window 302, in the framework based application program code. Window 306 can show current values and attributes for variables used when the conditional breakpoint triggered and interrupted the application program execution.

In the example shown in FIG. 3, the framework based application program code is interrupted at stack level 70 when the framework based application program code throws an exception. Arrow 314 indicates the conditional breakpoint code that caused the interruption. Arrow 316 indicates the stack level where the interruption occurred. As indicated by arrow 316, the framework based application code is interrupted at stack level 70, which is called from application controller CL_BSP_WD_CONTEXT_NODE_ASP and its method is GET_DQUERY_VALUEHELPS. The method can indicate the event that caused the conditional breakpoint to trigger.

Figure 4:
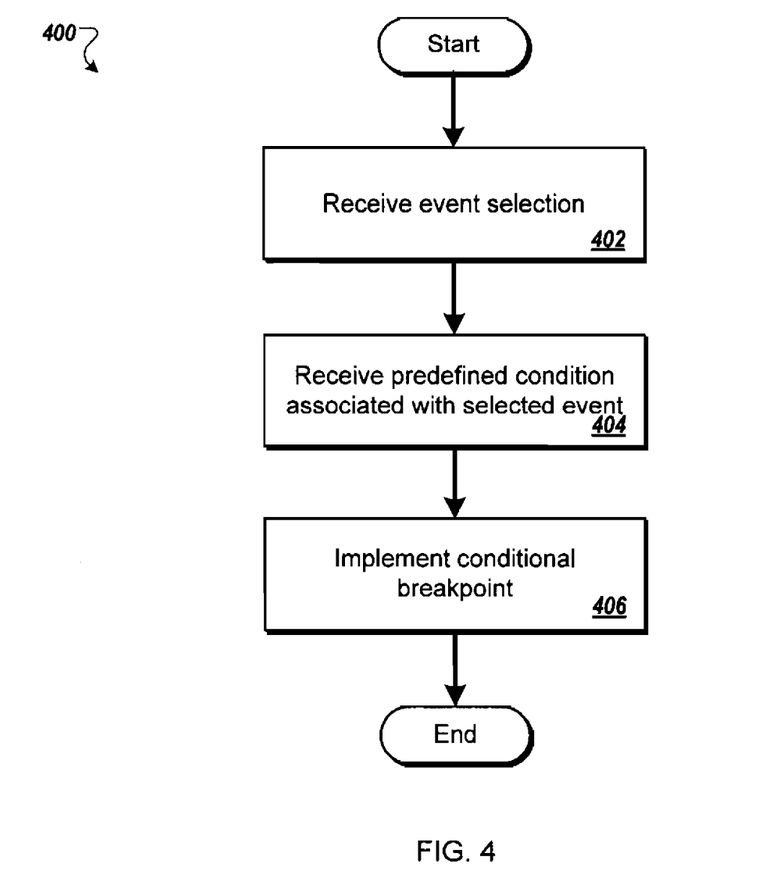
FIG. 4 is a flow chart of exemplary operations that can define a conditional breakpoint in an application program.

FIG. 4 is a flow chart of exemplary operations 400 that can define a conditional breakpoint in an application program. The operations 400 can be performed by a processor that executes instructions stored in a computer-readable medium. For example, a user can use the user interface 100, as described with reference to FIG. 1, to define one or more conditional breakpoints. The user can use the user interface 100 to select a location in the framework based application program code where the conditional breakpoint can occur, as well as the event that can trigger the conditional breakpoint. The user can also enter one or more conditions to be satisfied for the event that can trigger the conditional breakpoint.

A process begins at step 402 with the receiving of an event selection. A user, through user interface 100, can select a location in the framework based application program code to place the conditional breakpoint and the event that can trigger the conditional breakpoint. A predefined condition associated with the selected event can be received at step 404. For example, a user through user interface 100 can enter one or more conditions under which the conditional breakpoint can trigger for the selected event within the selected portion of the framework based application program. The conditions can be combined by a logical AND operator.

The conditional breakpoint is then implemented at step 406. For example, a user can check an enabled box included in the user interface 100 that is associated with the conditional breakpoint to enable the implementation of the conditional breakpoint in the framework based application program. Therefore, the conditional breakpoint can trigger when the selected event occurs and the conditional breakpoint conditions are satisfied.

Figure 5:
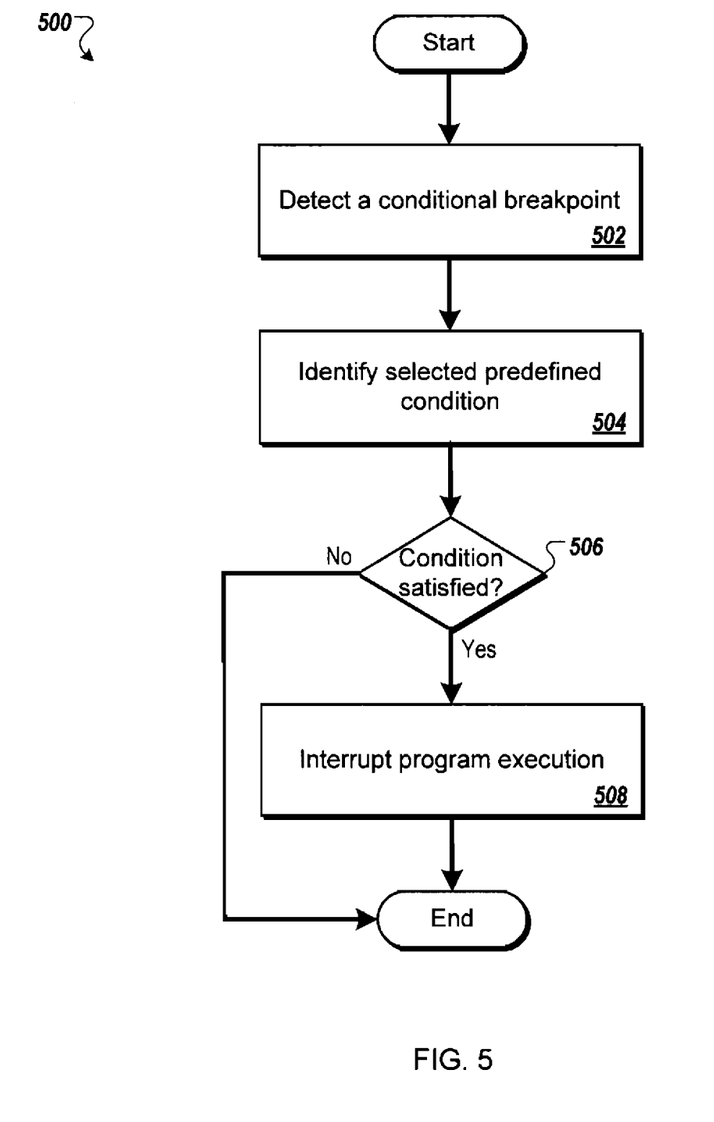
FIG. 5 is a flow chart of exemplary operations that can activate a conditional breakpoint in an application program.

FIG. 5 is a flow chart of exemplary operations 500 that can activate a conditional breakpoint in an application program. The operations 500 can be performed by a processor that executes instructions stored in a computer-readable medium. For example, a user can start execution of a framework based application program with conditional breakpoints and external debugging activated. Once the framework based application program is executing, the user can enter a specific hotkey combination (e.g., Alt-F2) to bring up the user interface 100, as described with reference to FIG. 1, which displays a conditional breakpoints window in the framework based application program. The user can select and enter events and conditions for a plurality of conditional breakpoints, selectively enable or disable the conditional breakpoints, and then activate the conditional breakpoints. Program execution can then resume from where it left off when the user activated the user interface 100.

A process starts when the executing framework based application program detects a conditional breakpoint in step 502. For example, this can occur when the application program code executes an ASSERT statement used to implement a conditional breakpoint. Examples of the ASSERT statement and the application code associated with the ASSERT statement for implementation of a conditional breakpoint were shown with reference to FIGS. 2 and 3.

The process then identifies the selected predefined condition for the event that may trigger the conditional breakpoint in step 504. In some implementations, more than one predefined condition for the event may exist and the multiple conditions can be combined with a logical AND operator. The process determines if the predefined condition for the event is satisfied in step 506. If the condition is not satisfied, the process ends and program execution continues until another conditional breakpoint is detected. If the condition is satisfied, the process interrupts program execution in step 508.

Figure 6:
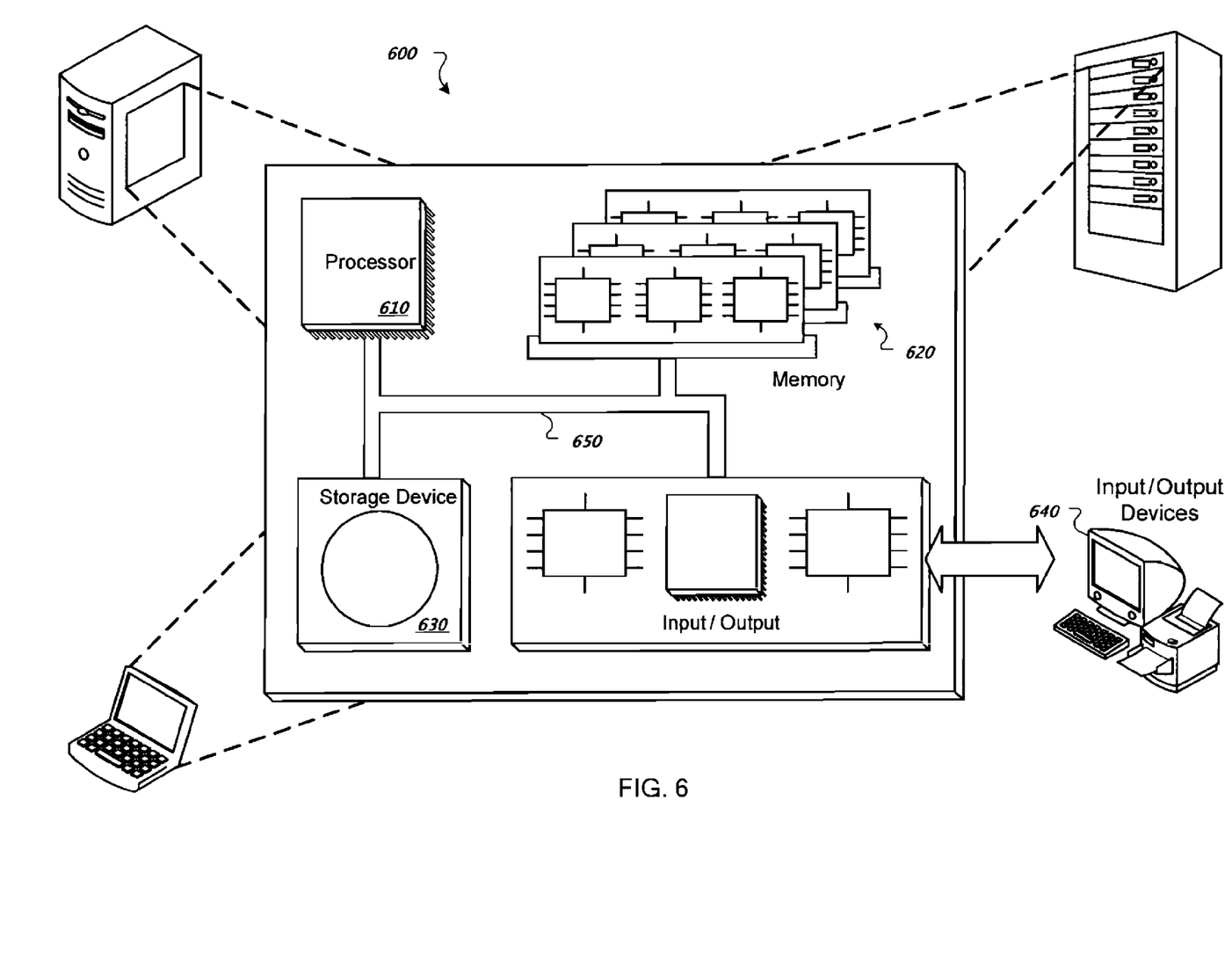
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method, comprising:
    executing, by a computing system, application program code into which an application program developer has introduced multiple portions of code that define multiple respective breakpoints;
    displaying, by the computing system, a user interface with which user input is able to specify a first condition that causes a first breakpoint of the multiple breakpoints to be activated upon the execution of the application program code reaching a location in the application program code at which the first breakpoint was introduced, wherein the user interface includes:
        (i) a first user interface element with which user input is able to specify the first breakpoint from among the multiple breakpoints,
        (ii) a first attribute selection element with which user input is able to specify a first attribute that is used to define the first condition,
        (iii) a first attribute value selection element with which user input is able to specify a first attribute value that is used to define the first condition,
        (iv) a second attribute selection element with which user input is able to specify a second attribute that is used to define the first condition, and
        (v) a second attribute value selection element with which user input is able to specify a second attribute value that is used to define the first condition;
    receiving, by the computing system, an indication that user input:
        (i) used the first user interface element to specify the first breakpoint from among the multiple breakpoints,
        (ii) used the first attribute selection element to specify the first attribute,
        (iii) used the first attribute value selection element to specify the first attribute value,
        (iv) used the second attribute selection element to specify the second attribute, and
        (v) used the second attribute value selection element to specify the second attribute value;
    determining, by the computing system upon the execution of the application program code reaching the location in the application program code at which the first breakpoint was introduced, that the first condition is satisfied due to:
        (a) the first attribute having a first value that matches the first attribute value that was specified using the first attribute value selection element, and
        (b) the second attribute having a second value that matches the second attribute value that was specified using the second attribute value selection element; and
    activating, by the computing system and in response to determining that the first condition is satisfied, the first breakpoint by halting the execution of the application program code at the location in the application program code at which the first breakpoint was introduced.

2. The computer-implemented method of claim 1, wherein the user interface with which user input is able to specify the first condition is displayed by the computing system as a result of the computing system receiving, during the execution of the application program code, user input that specifies a pre-defined combination of keys.

3. The computer-implemented method of claim 1, wherein:
    the user interface with which the user input is able to specify the first condition is displayed by the computing system as a result of the computing system receiving, during the execution of the application program code, a particular user input;
    the execution of the application program code halts in response to the computing system receiving the particular user input; and
    the execution of the application program code resumes in response to the computing system receiving user input that causes the computing system to remove the user interface from display.

4. The computer-implemented method of claim 1, wherein the user input that used the first user interface element to specify the first breakpoint includes user input that specifies a portion of the application program code at which the first breakpoint is located.

5. The computer-implemented method of claim 1, wherein the user input that used the first user interface element to specify the first breakpoint includes user input that specifies an event, from a pre-defined group of events, to trigger the first breakpoint.

6. The computer-implemented method of claim 1, wherein the user interface further includes a certain user interface element with which user input is able to deactivate the first breakpoint, without user interaction with the first attribute selection element, the first attribute value selection element, the second attribute selection element, and the second attribute value selection element.

7. The computer-implemented method of claim 1, wherein:
the user interface enables user input to specify a second condition that causes a second breakpoint of the multiple breakpoints to be activated upon the execution of the application program code reaching a location in the application program code at which the second breakpoint was introduced, wherein the user interface further includes:
(vi) a second user interface element with which user input is able to specify the second breakpoint from among the multiple breakpoints,
(vii) a third attribute selection element with which user input is able to specify a third attribute that is used to define the second condition,
(viii) a third attribute value selection element with which user input is able to specify a third attribute value that is used to define the second condition,
(ix) a fourth attribute selection element with which user input is able to specify a fourth attribute that is used to define the second condition, and
(x) a fourth attribute value selection element with which user input is able to specify a fourth attribute value that is used to define the second condition;
receiving, by the computing system, another indication that user input:
(vi) used the third user interface element to specify the second breakpoint from among the multiple breakpoints,
(vii) used the third attribute selection element to specify the third attribute,
(viii) used the third attribute value selection element to specify the third attribute value,
(ix) used the fourth attribute selection element to specify the fourth attribute, and
(x) used the fourth attribute value selection element to specify the fourth attribute value;
determining, by the computing system upon the execution of the application program code reaching the location in the application program code at which the second breakpoint was introduced, that the second condition is satisfied due to:
(a) the third attribute having a third value that matches the third attribute value that was specified using the third attribute value selection element, and
(b) the fourth attribute having a fourth value that matches the fourth attribute value that was specified using the fourth attribute value selection element; and
activating, by the computing system and in response to determining that the second condition is satisfied, the second breakpoint by halting the execution of the application program code at the location in the application program code at which the second breakpoint was introduced.

8. A non-transitory computer-readable storage medium comprising instructions that, when executed by a processor, cause performance of operations that comprise:
executing, by a computing system, application program code into which an application program developer has introduced multiple portions of code that define multiple respective breakpoints;
displaying, by the computing system, a user interface with which user input is able to specify a first condition that causes a first breakpoint of the multiple breakpoints to be activated upon the execution of the application program code reaching a location in the application program code at which the first breakpoint was introduced, wherein the user interface includes:
(i) a first user interface element with which user input is able to specify the first breakpoint from among the multiple breakpoints,
(ii) a first attribute selection element with which user input is able to specify a first attribute that is used to define the first condition,
(iii) a first attribute value selection element with which user input is able to specify a first attribute value that is used to define the first condition,
(iv) a second attribute selection element with which user input is able to specify a second attribute that is used to define the first condition, and
(v) a second attribute value selection element with which user input is able to specify a second attribute value that is used to define the first condition;
receiving, by the computing system, an indication that user input:
(i) used the first user interface element to specify the first breakpoint from among the multiple breakpoints,
(ii) used the first attribute selection element to specify the first attribute,
(iii) used the first attribute value selection element to specify the first attribute value,
(iv) used the second attribute selection element to specify the second attribute, and
(v) used the second attribute value selection element to specify the second attribute value;
determining, by the computing system upon the execution of the application program code reaching the location in the application program code at which the first breakpoint was introduced, that the first condition is satisfied due to:
(a) the first attribute having a first value that matches the first attribute value that was specified using the first attribute value selection element, and
(b) the second attribute having a second value that matches the second attribute value that was specified using the second attribute value selection element; and
activating, by the computing system and in response to determining that the first condition is satisfied, the first breakpoint by halting the execution of the application program code at the location in the application program code at which the first breakpoint was introduced.

9. The computer-readable storage medium of claim 8, wherein the user interface with which user input is able to specify the first condition is displayed by the computing system as a result of the computing system receiving, during the execution of the application program code, user input that specifies a pre-defined combination of keys.

10. The computer-readable storage medium of claim 8, wherein:
the user interface with which the user input is able to specify the first condition is displayed by the computing system as a result of the computing system receiving, during the execution of the application program code, a particular user input;
the execution of the application program code halts in response to the computing system receiving the particular user input; and
the execution of the application program code resumes in response to the computing system receiving user input that causes the computing system to remove the user interface from display.

11. The computer-readable storage medium of claim 8, wherein the user input that used the first user interface element to specify the first breakpoint includes user input that specifies a portion of the application program code at which the first breakpoint is located.

12. The computer-readable storage medium of claim 8, wherein the user input that used the first user interface element to specify the first breakpoint includes user input that specifies an event, from a pre-defined group of events, to trigger the first breakpoint.

13. The computer-readable storage medium of claim 8, wherein the user interface further includes a certain user interface element with which user input is able to deactivate the first breakpoint, without user interaction with the first attribute selection element, the first attribute value selection element, the second attribute selection element, and the second attribute value selection element.

14. The computer-readable storage medium of claim 8, wherein:
   the user interface enables user input to specify a second condition that causes a second breakpoint of the multiple breakpoints to be activated upon the execution of the application program code reaching a location in the application program code at which the second breakpoint was introduced, wherein the user interface further includes:
   (vi) a second user interface element with which user input is able to specify the second breakpoint from among the multiple breakpoints,
   (vii) a third attribute selection element with which user input is able to specify a third attribute that is used to define the second condition,
   (viii) a third attribute value selection element with which user input is able to specify a third attribute value that is used to define the second condition,
   (ix) a fourth attribute selection element with which user input is able to specify a fourth attribute that is used to define the second condition, and
   (x) a fourth attribute value selection element with which user input is able to specify a fourth attribute value that is used to define the second condition;
   receiving, by the computing system, another indication that user input:
   (vi) used the third user interface element to specify the second breakpoint from among the multiple breakpoints,
   (vii) used the third attribute selection element to specify the third attribute,
   (viii) used the third attribute value selection element to specify the third attribute value,
   (ix) used the fourth attribute selection element to specify the fourth attribute, and
   (x) used the fourth attribute value selection element to specify the fourth attribute value;
   determining, by the computing system upon the execution of the application program code reaching the location in the application program code at which the second breakpoint was introduced, that the second condition is satisfied due to:
   (a) the third attribute having a third value that matches the third attribute value that was specified using the third attribute value selection element, and
   (b) the fourth attribute having a fourth value that matches the fourth attribute value that was specified using the fourth attribute value selection element; and
   activating, by the computing system and in response to determining that the second condition is satisfied, the second breakpoint by halting the execution of the application program code at the location in the application program code at which the second breakpoint was introduced.

* * * * *